June 2, 1931. L. G. COPEMAN 1,807,587
SHARP FREEZING CONTAINER FOR ICE CREAM CABINETS
Filed July 5, 1929 2 Sheets-Sheet 1

INVENTOR.
Lloyd C. Copeman
BY
Stuart C. Barnes
ATTORNEY.

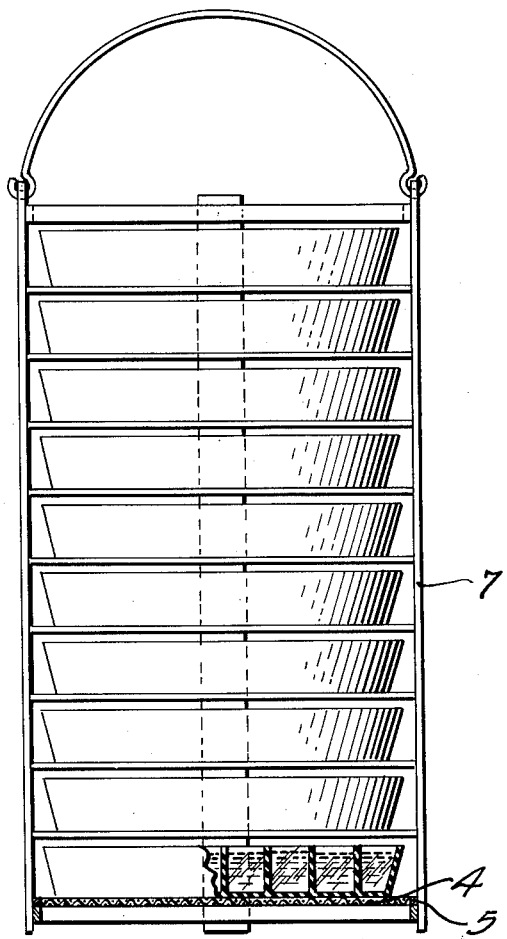
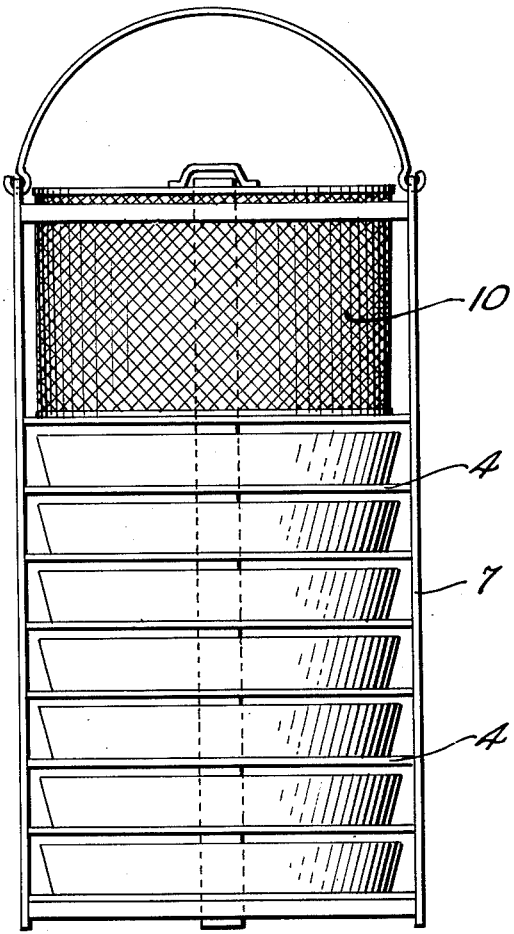
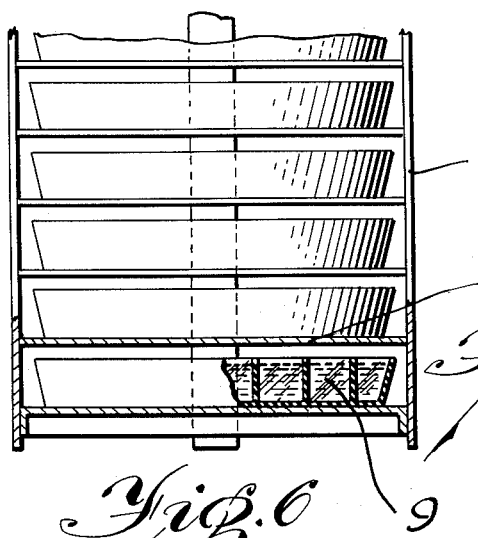
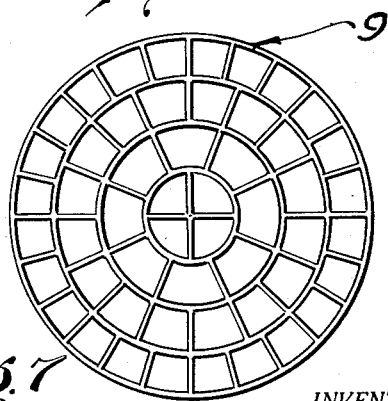

Patented June 2, 1931

1,807,587

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

SHARP FREEZING CONTAINER FOR ICE CREAM CABINETS

Application filed July 5, 1929. Serial No. 375,948.

This invention relates to sharp freezing containers for ice cream cabinets, and has to do particularly with a simple, inexpensive, and compact container unit for freezing and holding a supply of ice cubes.

With the advent of modern ice cream cabinets equipped with automatic refrigerating units, many stores using such cabinets have been without any readily available cracked ice in small quantities, making it necessary to have an extra available supply of ice independently of the ice cream cabinets.

It is the object of the present invention to provide a sharp freezing container adapted to be lowered into one of the standard receptacles of the ice cream cabinet. This sharp freezing unit is so formed as to receive a plurality of ice cube trays which may be independently and easily removed by moving the sharp freezing container to various heights. Another feature of the invention resides in the provision of a hopper or basket for maintaining an available supply of ice cubes.

In the drawings:

Fig. 4 is a vertical elevation of a modified form of sharp freezing container wherein the shelves for trays extend to the top of the unit.

Fig. 5 is an elevation of the preferred form of my container wherein the shelves extend only part way to the top leaving a space for receiving the basket or hopper.

Fig. 6 is a fragmentary side elevation, partly in section, illustrating a modified manner of forming the container structure.

Fig. 7 is a plan view of a modified design of ice cube tray.

Figure 1:
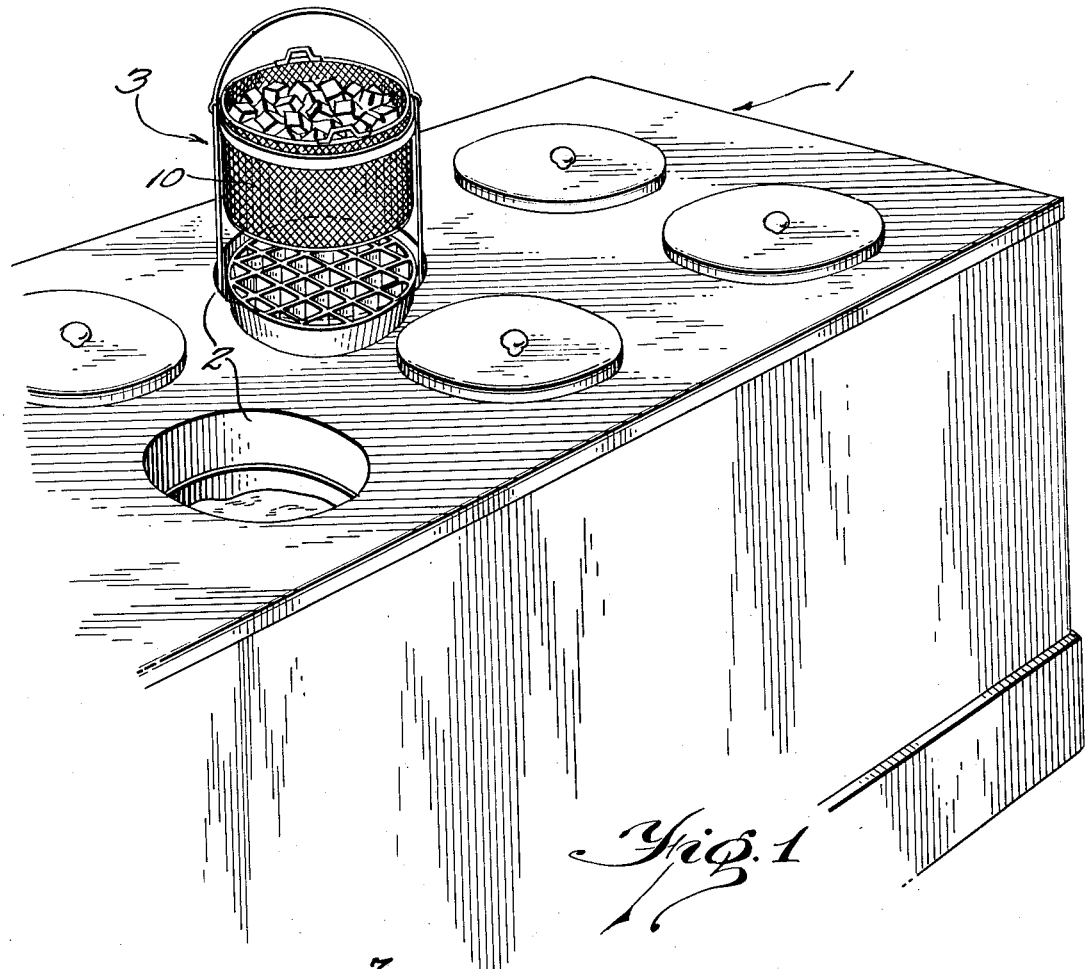
Fig. 1 is a perspective view of an ice cream cabinet equipped with my sharp freezing container and showing the same partly raised whereby the top ice cube tray may be removed.

My novel container unit may be used in connection with any type of ice cream cabinet, and in Fig. 1 I have shown a standard ice cream cabinet generally designated 1, and provided with the usual apertures 2 for receiving the ice cream cans. It will be understood that the apertures 2 in the top of the cabinet may be either single or double, the point being that a receptacle is provided which is substantially cylindrical in shape for receiving the sharp freezing container, although it will be obvious that the receptacle may be square or any other desired shape. In fact, the usual rectangular receptacle provided in ice cream cabinets for storing ice cream bricks and the like might be well adapted for receiving a sharp freezing container of the present type, as in this case the ice cube tray could be formed rectangular instead of circular.

My preferred form of container unit is best shown in Fig. 5, and is generally designated 3 in Fig. 1. This unit preferably comprises a series of shelves 4 preferably formed of wire, and a series of annular rings or hoop members 5 suitably welded or soldered as at 6 to a series of vertical stay members 7.

The annular ring members 5 may be a part of the wire mesh going to make up the shelves 4 or may be suitably secured thereto in any manner desired. Conductivity is more important in the structure of this unit and the shelves than strength, as the only strain upon the shelves is that of the weight of the ice cube tray itself. The shelves 4 may, as shown in Fig. 6, be formed of sheet metal, as shown at 8, in which case it will be obvious that such shelves may be directly soldered or welded to the vertical stay members 7.

Figures 2, 3:
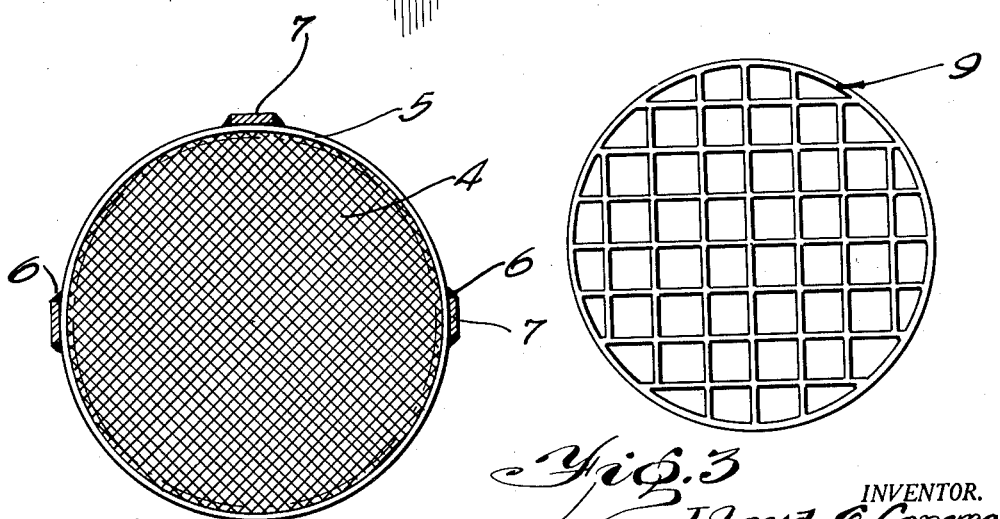
Fig. 2 is a horizontal sectional view taken through my preferred form of sharp freezing container.
Fig. 3 is a plan view of the preferred form of ice cube tray for use with my container.

The vertical stay members 7 are preferably arranged as best shown in Fig. 2 whereby they give sufficient strength to the unit to hold it securely together and at the same time permit an ice cube tray of any width to be withdrawn therefrom, as best shown in Fig. 1. The ice cube tray is preferably formed of rubber whereby to permit of easy removal of the ice cubes. The tray being formed of rubber, it will be obvious that the ice will not readily adhere thereto and by merely slightly distorting the flexible rubber tray, the ice cubes may be very readily removed.

This rubber tray may be molded in various shapes and forms, and in Fig. 7 I have shown my preferred form of ice cube tray for use with the sharp freezing container of the present invention, wherein the same is substantially circular in cross section as shown in Figs. 1 and 2. This tray may be generally designated 9 and may be molded so as to form a plurality of ice cube forming chambers, the partitions being formed of rubber the same as the side walls. One form of tray is shown in Fig. 3 and a modified form is shown in Fig. 7. It will be obvious that this tray may be rectangular in shape so that each ice cube would be substantially rectangular or square, but in order to conserve as much space as possible I preferably form the ice cube tray of circular shape.

In my preferred form of sharp freezing unit, as shown in Fig. 5, I preferably leave a space at the top of the unit for receiving and positioning a suitable basket 10. This basket 10 forms a hopper for receiving the dry ice cubes as they are removed from the rubber ice cube trays. In other words, in view of the fact that the ice cubes may be readily removed from the rubber trays without melting or applying water thereto, it will be obvious that they will remain perfectly dry. A certain number of these cubes may be dumped into the basket 10 and retained in their dry condition as long as the unit is positioned within a receptacle of the ice cream cabinet.

This basket, of course, is readily removable, and may take any desired shape, but having once been filled or partially filled with cubes, it will be obvious that the entire unit may remain lowered for a considerable length of time, as it will be only necessary to reach into the top of the receptacle and take out as many cubes as desired. The ice cubes being initially dry and retained in this condition by the temperature in the receptacle, it will be obvious that they will not stick together but will be readily accessible. It will also be obvious that the shelves of the container may in part be used for the storage of other articles such as ice cream bricks, etc.

What I claim is:

1. A sharp freezing container for ice cream cabinets having vertically positioned receptacles, comprising a unit having a plurality of vertically spaced shelves, a plurality of vertical stays for connecting and positioning the shelves, and one or more ice cube trays positioned on said shelves, said vertical stays being so positioned as to permit horizontal removal of a tray from a shelf as the unit is raised from the ice cream cabinet receptacle.

2. A sharp freezing unit for ice cream cabinets and the like having vertically positioned cooling unit receptacles, comprising a framework unit having a plurality of vertically spaced shelves for receiving ice cube trays, rubber ice cube trays positioned on said shelves, and a hopper carried by said unit for receiving the dry ice cubes removed from said rubber tray.

3. A sharp freezing unit for use in an aperture of an ice cream cabinet, comprising a plurality of vertically spaced shelves held together by a plurality of vertically positioned stays, rubber ice cube trays, substantially the same width as said shelves, positioned on said shelves, and a hopper member positioned at the top of said unit for receiving ice cubes from said trays, said vertical stays being so positioned as to permit horizontal removal of each ice cube tray.

4. A sharp freezing container for use with ice cream cabinets and the like having vertically positioned cooling receptacles, comprising a framework provided with a plurality of vertical spaced metal shelves, a hopper structure positioned at the top of said framework for receiving ice cubes, and a plurality of rubber ice cube trays of substantially the same shape as the opening in the ice cream cabinet positioned on said shelves, the said unit being vertically movable in a receptacle whereby each tray may be removed horizontally and the contents thereof dumped into said hopper or otherwise used.

In testimony whereof I affix my signature.

LLOYD G. COPEMAN.